(12) United States Patent
Cheng et al.

(10) Patent No.: US 9,331,489 B2
(45) Date of Patent: May 3, 2016

(54) MAXIMIZING POWER PRODUCTION AT LOW SUNLIGHT BY SOLAR POWER MINI-INVERTERS

(71) Applicant: CyboEnergy, Inc., Rancho Cordova, CA (US)

(72) Inventors: George Shu-Xing Cheng, Folsom, CA (US); Steven L. Mulkey, Cameron Park, CA (US); Andrew J. Chow, Sacramento, CA (US)

(73) Assignee: CyboEnergy, Inc., Rancho Cordova, CA (US)

( * ) Notice: Subject to any disclaimer, the term of this patent is extended or adjusted under 35 U.S.C. 154(b) by 507 days.

(21) Appl. No.: 13/789,637

(22) Filed: Mar. 7, 2013

(65) Prior Publication Data
US 2014/0252862 A1 Sep. 11, 2014

(51) Int. Cl.
*H02M 7/537* (2006.01)
*H02J 3/38* (2006.01)

(52) U.S. Cl.
CPC .............. *H02J 3/385* (2013.01); *Y02E 10/58* (2013.01); *Y10T 307/707* (2015.04)

(58) Field of Classification Search
CPC ............. H02J 1/102; H02J 3/36; H02J 1/10; H02J 1/08; H02J 3/382; H02J 3/385; Y02E 10/58; Y10T 307/707
USPC ........................................................ 307/82
See application file for complete search history.

(56) References Cited

U.S. PATENT DOCUMENTS

| | | | |
|---|---|---|---|
| RE37,126 E * | 4/2001 | Peng et al. | 363/137 |
| 8,102,074 B2 * | 1/2012 | Hadar et al. | 307/5 |
| 2003/0111103 A1 * | 6/2003 | Bower et al. | 136/244 |
| 2009/0000654 A1 * | 1/2009 | Rotzoll et al. | 136/244 |
| 2010/0237703 A1 * | 9/2010 | Stern | 307/77 |
| 2011/0012430 A1 * | 1/2011 | Cheng et al. | 307/82 |
| 2011/0084556 A1 * | 4/2011 | Marroquin et al. | 307/82 |
| 2011/0273022 A1 * | 11/2011 | Dennis et al. | 307/72 |
| 2012/0025618 A1 * | 2/2012 | Erickson et al. | 307/77 |
| 2012/0138123 A1 * | 6/2012 | Newdoll et al. | 136/246 |
| 2012/0212065 A1 * | 8/2012 | Cheng et al. | 307/82 |
| 2012/0313443 A1 * | 12/2012 | Cheng et al. | 307/82 |
| 2013/0002031 A1 * | 1/2013 | Mulkey et al. | 307/82 |
| 2014/0265584 A1 * | 9/2014 | Cheng et al. | 307/52 |

* cited by examiner

*Primary Examiner* — Thienvu Tran
*Assistant Examiner* — Brian K Baxter
(74) *Attorney, Agent, or Firm* — Donald E. Stout; Stout, Uxa & Buyan, LLP (57) ABSTRACT

A method and apparatus is disclosed for maximizing power production for solar power systems when there is low sunlight during sunrise, sunset, clouding, partial shading, and other low irradiance conditions. A multiple-channel solar power Mini-Inverter can work in the low power mode when there is low sunlight, take power from one solar panel to supply DC power to its internal electronic circuits, and also invert the DC power from the remaining connected solar panels to single-phase or three-phase AC power feeding to the electrical grid or powering AC loads. This invention can significantly reduce the required startup and shutdown irradiance and DC power for the solar power inverter, avoid undesirable shutdowns due to partial shading, and allow the inverter to run in power generation mode for a few more hours each day.

16 Claims, 9 Drawing Sheets

MAXIMIZING POWER PRODUCTION AT LOW SUNLIGHT BY SOLAR POWER MINI-INVERTERS

INVENTION

The subject of this patent relates to direct current (DC) to alternating current (AC) power inverters that invert DC power from single or multiple DC power sources to single-phase or three-phase AC power, where the DC power sources include but are not limited to photovoltaic (PV) solar modules, fuel cells, batteries, and other DC power generators. More particularly, this patent relates to a method and apparatus that can maximize power production for solar power systems when there is low sunlight during sunrise, sunset, clouding, and partial shading conditions.

In the U.S. patent application Ser. No. 12/837,162, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application No. 61/442,991, the entirety of which is hereby incorporated by reference, we described the Scalable and Redundant Mini-Inverters that have double, triple, or quadruple redundant capabilities so that the Mini-Inverters can work in a harsh environment for a prolonged period of time. A number of regular, redundant, triple redundant, or quadruple redundant Mini-Inverters with one, two, three, or multiple input channels in a mixed variety can easily connect to one, two, three, or multiple DC power sources such as solar PV modules, invert the DC power to AC power, and daisy chain together to generate AC power to feed the power grid.

In the U.S. patent application No. 61/495,540, the entirety of which is hereby incorporated by reference, we described the Smart and Scalable Off-Grid Mini-Inverters that not only have the key scalable and redundant features as described in U.S. patent application Ser. No. 12/837,162 and No. 61/442,991, but can also supply power to electrical devices that are not connected to the power grid including motors, pumps, fans, lights, appliances, and homes.

In this patent, a method and apparatus is disclosed for maximizing power production for solar power systems when there is low sunlight during sunrise, sunset, clouding, and partial shading conditions. A multiple-channel solar power Mini-Inverter can work in the low power mode when there is low sunlight, take power from one solar panel to supply DC power to its internal electronic circuits, and also invert the DC power from the remaining connected solar panels to single-phase or three-phase AC power to be sent to the power grid or AC loads. This invention can significantly reduce the required startup and shutdown irradiance and DC power for the solar power inverter, avoid undesirable shutdowns due to partial shading, and allow the inverter to run in power generation mode for a few more hours each day.

The term "mechanism" is used herein to represent hardware, software, or any combination thereof. The term "solar module" or "solar panel" refers to photovoltaic (PV) solar modules. The term "AC load" is used herein to represent one or more single-phase or three-phase electrical devices including but not limited to motors, pumps, fans, lights, appliances, and homes.

Throughout this document, m=1, 2, 3, . . . , as an integer, which is used to indicate the number of the DC input ports of a Mini-Inverter. The term "input channel" refers to the DC input port of the Mini-Inverter. Then, an m-channel Mini-Inverter means that the Mini-Inverter has m input channels or m DC input ports.

Throughout this document, if a solar power inverter is used to generate single-phase AC, it can also be applied to three-phase AC without departing from the spirit or scope of our invention. If a solar power inverter is used to generate three-phase AC, it can also be applied to single-phase AC without departing from the spirit or scope of our invention.

Without losing generality, all numerical values given in this patent are examples. Other values can be used without departing from the spirit or scope of our invention. The description of specific embodiments herein is for demonstration purposes and in no way limits the scope of this disclosure to exclude other not specially described embodiments of this invention.

DESCRIPTION

In a solar power system, solar panels and inverters work together to collect solar energy and convert it into usable electricity. A solar power inverter inverts the DC power generated by solar panels to AC power feeding the electrical grid or powering AC loads. While solar panels have become commodity products, inverters remain a key energy harvest component that has attracted a lot of attention and investment.

Most of today's solar power inverters are designed based on switching power supply techniques and include power electronic circuits, digital microcontroller circuits, communication circuits, etc. These circuits require DC power in order to work. For instance, a digital microcontroller typically needs 3.3V DC power. The switching power supply circuits include MOSFETs and MOSFET drivers, where the MOSFET drivers typically require 12V-15V DC to operate. Therefore, a solar power inverter typically consists of internal DC power supplies that can provide DC power at 3.3V, 5V, and 15V to its internal electronic circuits and components.

Where does the input power for these internal DC power supplies come from? A grid-interactive solar power inverter is connected to the AC powerline. As described in the U.S. patent application Ser. No. 12/837,162, a solar power inverter can be designed to include a DC power supply unit that can take the AC power from the grid, invert it to DC power, and supply the appropriate DC voltages to power the internal electronic circuits. This design includes the following shortcomings: (i) Inverting AC to DC power adds more complexity and cost; (ii) AC power is consumed even when the inverter is in the sleep mode; and (iii) It does not work for off-grid solar power inverters, where AC power is not available.

Another simpler design is to take the DC power from the solar panel directly or indirectly. As described in the U.S. patent applications No. 61/442,991 and No. 61/495,540, a grid-interactive solar power inverter or an off-grid solar power inverter can be designed to include an internal DC power supply to take power from the connected solar panel(s) and provide proper DC power to its internal electronic circuits. This design, however, has a major limitation due to the DC power characteristics of the solar panel.

Figure 1:
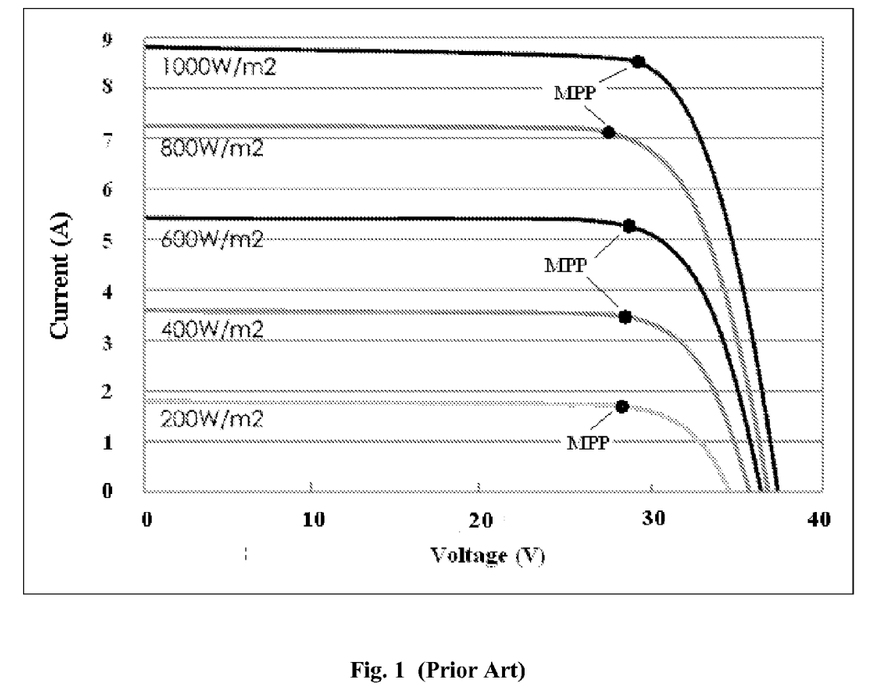
FIG. 1 shows the I-V curve of a typical solar panel at different irradiances, where the current to voltage characteristics of the solar panel is represented at different sunlight levels.

FIG. 1 shows the I-V curve of a typical solar panel at different irradiances, where the current to voltage characteristics of the solar panel is represented at different sunlight levels. For instance, at 1000 W/m2, when the sunlight is quite strong, the solar panel can supply about 260 W DC power at a condition of Voltage=30V and Current=8.7 A. (Power=Voltage×Current). This is a Maximum Power Point (MPP) marked on the chart. A well designed solar power inverter should have a good MPPT (Maximum Power Point Tracking) mechanism to search for the Maximum Power Point (MPP) under varying irradiance conditions. The inverter needs to be controlled to work at the Maximum Power Point under sunlight variations and partial shading conditions, while feeding power to the grid and meeting all AC synchronization and power quality requirements.

The challenge happens when even a small portion of the solar panel is shaded by clouds or trees. In this case, the equivalent irradiance can suddenly drop from 1000 W/m2 to 200 W/m2 or less. When the inverter tries to pull power from the solar panel, current is trying to increase which will cause the panel voltage to drop immediately from 30V to 15V or less. This phenomenon can be seen from the I-V curve. If the solar panel cannot supply sufficient power, a small amount of current increase will cause voltage to decrease by a large amount. Since the internal DC power supply needs to supply power at 15V, its DC input power needs to be at least 18V. When the solar panel voltage drops below 18V, the internal power supply can no longer supply 15V DC to its internal electronic circuits. Then, the inverter is forced to shutdown or stop generating AC power.

All grid-interactive solar power inverters must meet UL-1741 and IEEE-1547 requirements to assure safety. Once disconnected from the power grid, a five-minute wait is mandatory before the inverter can attempt to restart or reconnect to the grid. This means, shutdowns of solar power inverters due to temporary partial shading or low sunlight condition can result in unnecessary power generation loss. In addition, during sunrise and sunset when the irradiance is low, most solar power inverters will have a difficult time generating AC power and providing adequate DC power to its internal electronics at the same time.

Figure 2:
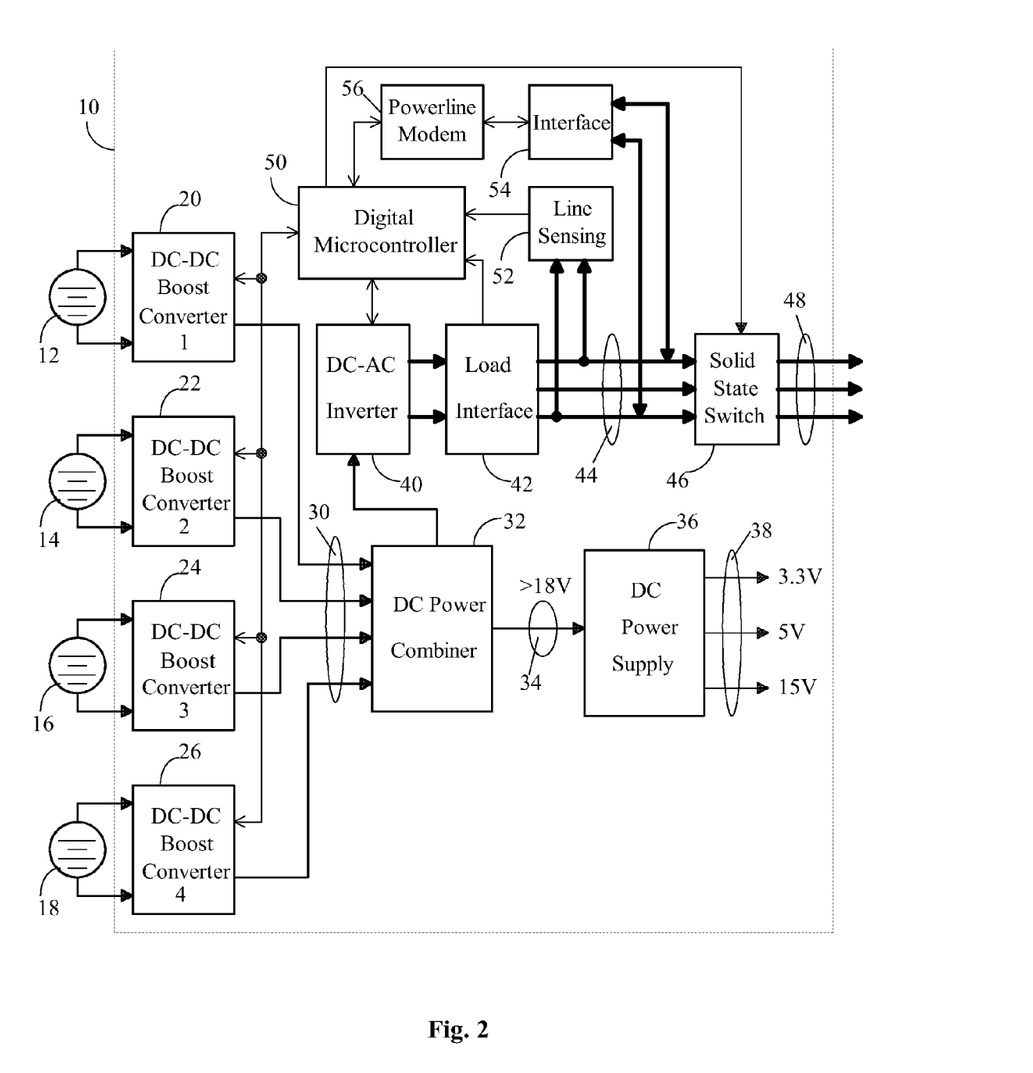
FIG. 2 is a block diagram illustrating a 4-channel solar power Mini-Inverter that inverts the DC power from 4 solar panels to single-phase or three-phase AC power being sent to the power grid according to an embodiment of this invention.

FIG. 2 is a block diagram illustrating a 4-channel solar power Mini-Inverter that inverts the DC power from 4 solar panels to single-phase or three-phase AC power being sent to the power grid according to an embodiment of this invention.

The 4-channel solar power inverter 10 is connected to 4 solar panels 12, 14, 16, 18 as DC sources. The inverter comprises 4 DC-DC boost converters 20, 22, 24, 26, a DC power combiner 32, a DC power supply 36, a DC-AC inverter 40, a load interface circuit 42, an internal AC powerline 44, a solid-state switch circuit 46, an external AC powerline 48 that connects to the grid, a digital microcontroller 50, a line sensing circuit 52, an interface circuit for powerline communications 54, and a powerline communications Modem 56.

As mentioned earlier, the term "channel" or "input channel" refers to the DC input port of the Mini-Inverter. Without losing generality, an input channel may comprise a DC-DC boost converter, measurement circuits, supporting circuits, and cables and connectors to connect to a solar panel. A 4-channel Mini-Inverter means that the Mini-Inverter has 4 input channels.

During normal operating conditions where there is sufficient sunlight, the power from solar panels 12, 14, 16, 18 is delivered to the corresponding DC-DC boost converters 20, 22, 24, 26, respectively. The DC power is then combined in the DC power combiner 32. The total combined DC power is inverted to AC power with voltage larger than 240 VAC by the DC-AC inverter 40. The generated AC power goes through the load interface circuit 42 to be combined with the AC power in the internal AC powerline 44. A solid-state switch 46 controlled by the digital microcontroller 50 is used to isolate the internal AC powerline 44 from the external AC powerline 48 when solar power is not being generated. A line sensing circuit 52 connected to the internal AC powerline 44 is used to detect the phase and zero-crossing point of the incoming AC power from the power grid. The phase and zero-crossing point signals are sent to the digital microcontroller 50 for AC power synchronization to assure that the power inverter provides high quality synchronized power to the grid. A powerline communications Modem 56, which is isolated by an interface circuit 54, is used to establish a 2-way digital signal communication between the digital microcontroller 50 and the outside world through the AC powerline. The internal DC power supply 36 takes DC power from one of the solar panels through its corresponding DC converter and the DC combiner to supply DC power to the internal electronics.

The digital microcontroller 50 is used to perform a number of tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each solar panel, (v) performing DC-AC inversion, AC power synchronization, and AC output current control, (vi) monitoring AC current and voltage for generated power amount and status, (vii) performing powerline communications, and (viii) performing logic controls such as AC powerline switching and isolation.

During normal operating conditions when there is sufficient sunlight, all 4 channels of the Mini-Inverter can run in the power generation mode and stay at the maximum power point (MPP) under irradiance variations. If there is sufficient irradiance, the Mini-Inverter can generate full rated AC power to feed the grid. During sunrise, sunset, clouding, or partial shading conditions, the Mini-Inverter can detect the low sunlight condition based on the DC input power, which is calculated using measured input voltage and current. Then, it will go into the low power mode.

Figure 3:
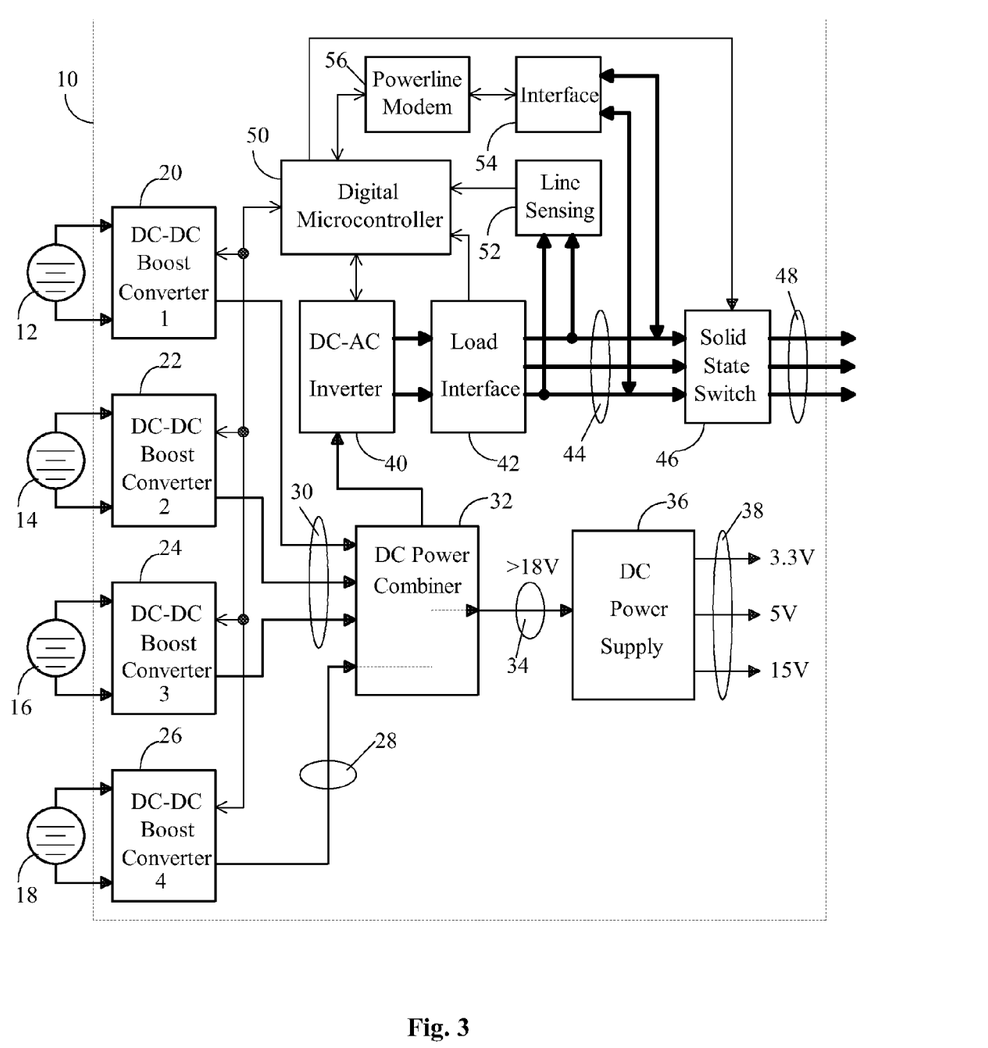
FIG. 3 is a block diagram illustrating the same 4-channel solar power Mini-Inverter as in FIG. 2, working in the low power mode, where it can take power from one solar panel to supply DC power to its internal electronics and also invert the DC power from three solar panels to single-phase or three-phase AC power being sent to the power grid according to an embodiment of this invention.

FIG. 3 is a block diagram illustrating the same 4-channel solar power Mini-Inverter as in FIG. 2, working in the low power mode, where it can take power from one solar panel to supply DC power to its internal electronics and also invert the DC power from three solar panels to single-phase or three-phase AC power being sent to the power grid according to an embodiment of this invention.

In the low power mode, the digital microcontroller 50 will select a channel such as channel 4 and control the corresponding DC-DC boost converter 26 so that it stops pulling power from its connected solar panel 18 for AC power generation. As illustrated in FIG. 3, the DC power from solar panel 18 can pass through the DC converter 26 and DC power combiner 32, and enter DC power supply 36. Since a typical 60-cell or 72-cell solar panel will have an open-circuit voltage of 30V to 45V, and since the DC power supply takes only a small amount of power to power the internal circuits, the DC power line 28 and 34 can easily maintain at a voltage that is higher than 18V. In this novel design, the 4-channel solar power Mini-Inverter can avoid any unnecessary shutdowns caused by low irradiance situations. It can avoid the mandatory 5-minute wait since the inverter can stay connected to the power grid. If there is even a small amount of sunlight, the remaining 3 channels can still generate power. Our tests show that each input channel can keep sending AC power to the grid at a condition where the solar panel supplies only 1.5 W DC at voltage=14V and current=0.11 A. This is 0.6% power of a 250 W solar panel. Most solar power inverters will be forced to shut down much sooner.

This low irradiance DC power supply design significantly reduces the required startup and shutdown irradiance and DC power for the solar power inverter, and avoids undesirable shutdowns and grid disconnects due to partial shading. It allows the inverter to run in power generation mode for a few more hours each day compared with microinverters and central inverters that have only one input channel Imagining the extra power that can be generated day after day and year after year, this technology can have a big impact to the solar power industry.

Figure 4:
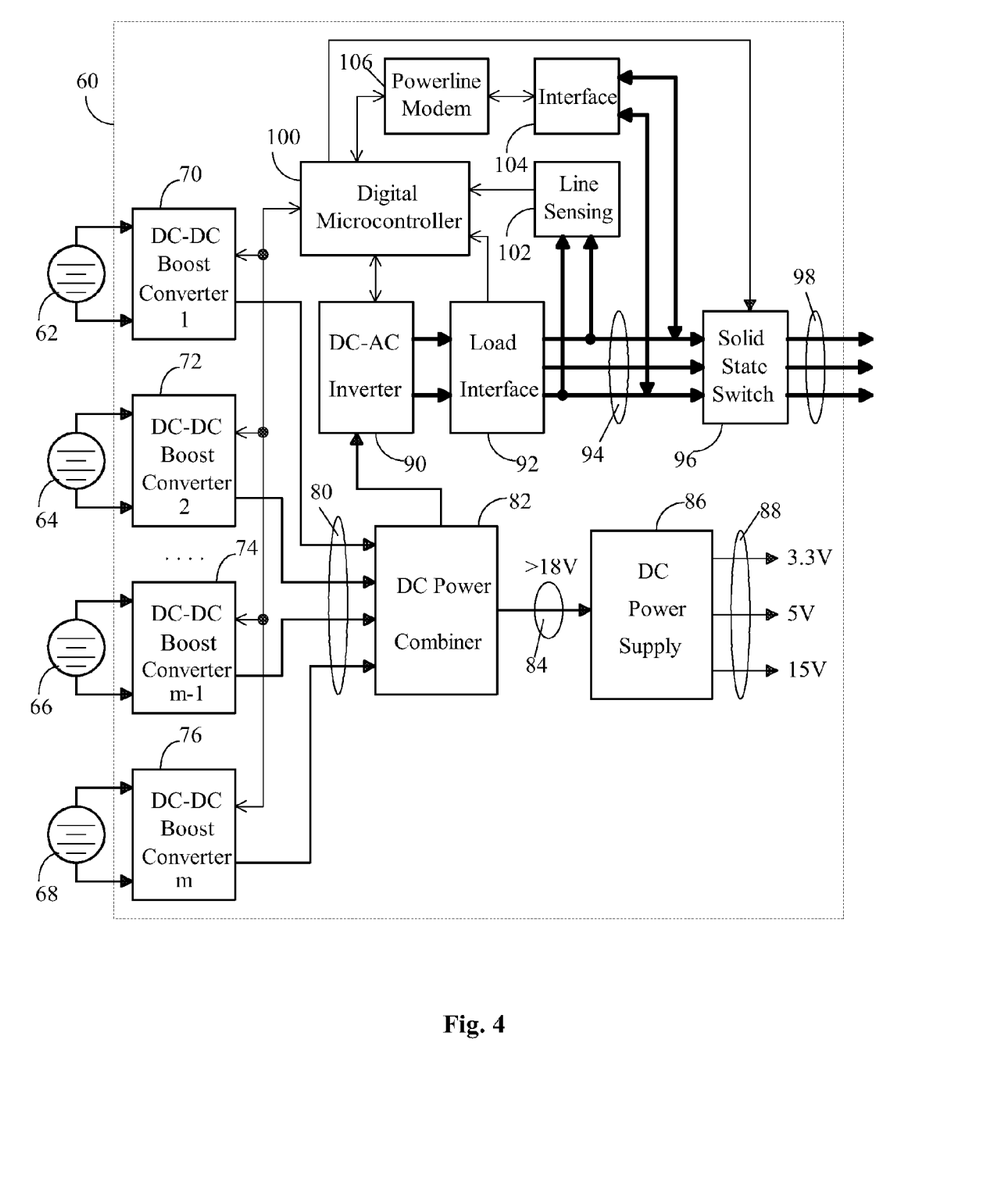
FIG. 4 is a block diagram illustrating an m-channel solar power Mini-Inverter that inverts the DC power from m solar panels to single-phase or three-phase AC power being sent to the power grid according to an embodiment of this invention.

FIG. 4 is a block diagram illustrating an m-channel solar power Mini-Inverter that inverts the DC power from m solar panels to single-phase or three-phase AC power being sent to the power grid according to an embodiment of this invention.

As mentioned earlier, an m-channel Mini-Inverter means that the Mini-Inverter has m input channels, where m=1, 2, 3, . . . , as an integer. If the Mini-Inverter has only one channel available, where m=1, then there is no need to use this channel just to supply DC power to the internal power supply.

The m-channel solar power inverter 60 is connected to m solar panels 62, 64, 66, 68 as DC sources. The Mini-Inverter comprises m DC-DC boost converters 70, 72, 74, 76, a DC power combiner 82, a DC power supply 86, a DC-AC inverter 90, a load interface circuit 92, an internal AC powerline 94, a solid-state switch circuit 96, an external AC powerline 98 that connects to the grid, a digital microcontroller 100, a line sensing circuit 102, an interface circuit for powerline communications 104, and a powerline communications Modem 106.

During normal operating conditions where there is sufficient sunlight, the power from solar panels 62, 64, 66, 68 is delivered to the corresponding DC-DC boost converters 70, 72, 74, 76, respectively. The DC power is then combined in the DC power combiner 82. The total combined DC power is inverted to AC power with voltage larger than 240 VAC by the DC-AC inverter 90. The generated AC power goes through the load interface circuit 92 to be combined with the AC power in the internal AC powerline 94. A solid-state switch 96 controlled by the digital microcontroller 100 is used to isolate the internal AC powerline 94 from the external AC powerline 98 when solar power is not being generated. A line sensing circuit 102 connected to the internal AC powerline 94 is used to detect the phase and zero-crossing point of the incoming AC power from the power grid. The phase and zero-crossing point signals are sent to the digital microcontroller 100 for AC power synchronization to assure that the Mini-Inverter provides high quality synchronized power to the grid. A powerline communications Modem 106, which is isolated by an interface circuit 104, is used to establish a 2-way digital signal communication between the digital microcontroller 100 and the outside world through the AC powerline. The internal DC power supply 86 takes DC power from one of the solar panels through its corresponding DC converter and the DC combiner to supply DC power to the internal electronics.

The digital microcontroller 100 is used to perform a number of tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each solar panel, (v) performing DC-AC inversion, AC power synchronization, and AC output current control, (vi) monitoring AC current and voltage for generated power amount and status, (vii) performing powerline communications, and (viii) performing logic controls such as AC powerline switching and isolation.

During normal operating conditions when there is sufficient sunlight, all m channels of the Mini-Inverter can run in the power generation mode and stay at the maximum power point (MPP) under irradiance variations. If there is sufficient irradiance, the Mini-Inverter can generate full rated AC power to feed the grid. During sunrise, sunset, clouding, or partial shading conditions, the Mini-Inverter can detect the low sunlight situation based on calculated DC input power. Then, it will go into the low power mode.

Figure 5:
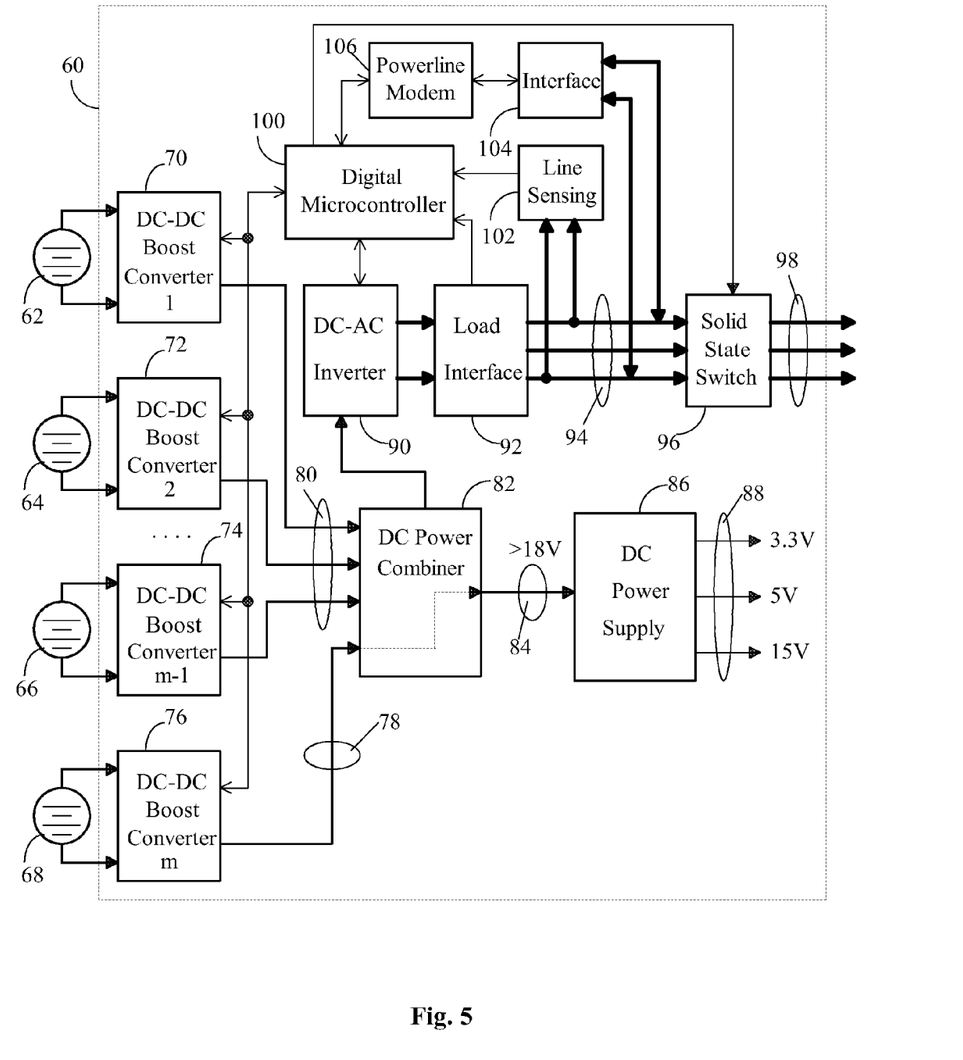
FIG. 5 is a block diagram illustrating the same m-channel solar power Mini-Inverter as in FIG. 4, working in the low power mode, where it can take power from one solar panel to supply DC power to its internal electronics and also invert the DC power from the remaining m−1 connected solar panels to single-phase or three-phase AC power being sent to the power grid according to an embodiment of this invention.

FIG. 5 is a block diagram illustrating the same m-channel solar power Mini-Inverter as in FIG. 4, working in the low power mode, where it can take power from one solar panel to supply DC power to its internal electronics and also invert the DC power from the remaining m−1 connected solar panels to single-phase or three-phase AC power being sent to the power grid according to an embodiment of this invention.

In the low power mode, the digital microcontroller 100 will select a channel such as channel m and control the corresponding DC-DC boost converter 76 so that it stops pulling power from its connected solar panel 68 for AC power generation. As illustrated in FIG. 5, the DC power from solar panel 68 can pass through the DC converter 76 and DC power combiner 82, and enter DC power supply 86. Since a typical 60-cell or 72-cell solar panel will have an open-circuit voltage of 30V to 45V, and since the DC power supply takes only a small amount of power to power the internal circuits, the DC power line 78 and 84 can easily maintain at a voltage that is higher than 18V. In this novel design, the m-channel solar power Mini-Inverter can avoid any unnecessary shutdowns caused by low irradiance conditions. It can avoid the mandatory 5-minute wait since the Mini-Inverter can stay connected to the power grid. If there is a small amount of sunlight, the remaining m−1 channels can still generate power.

Figure 6:
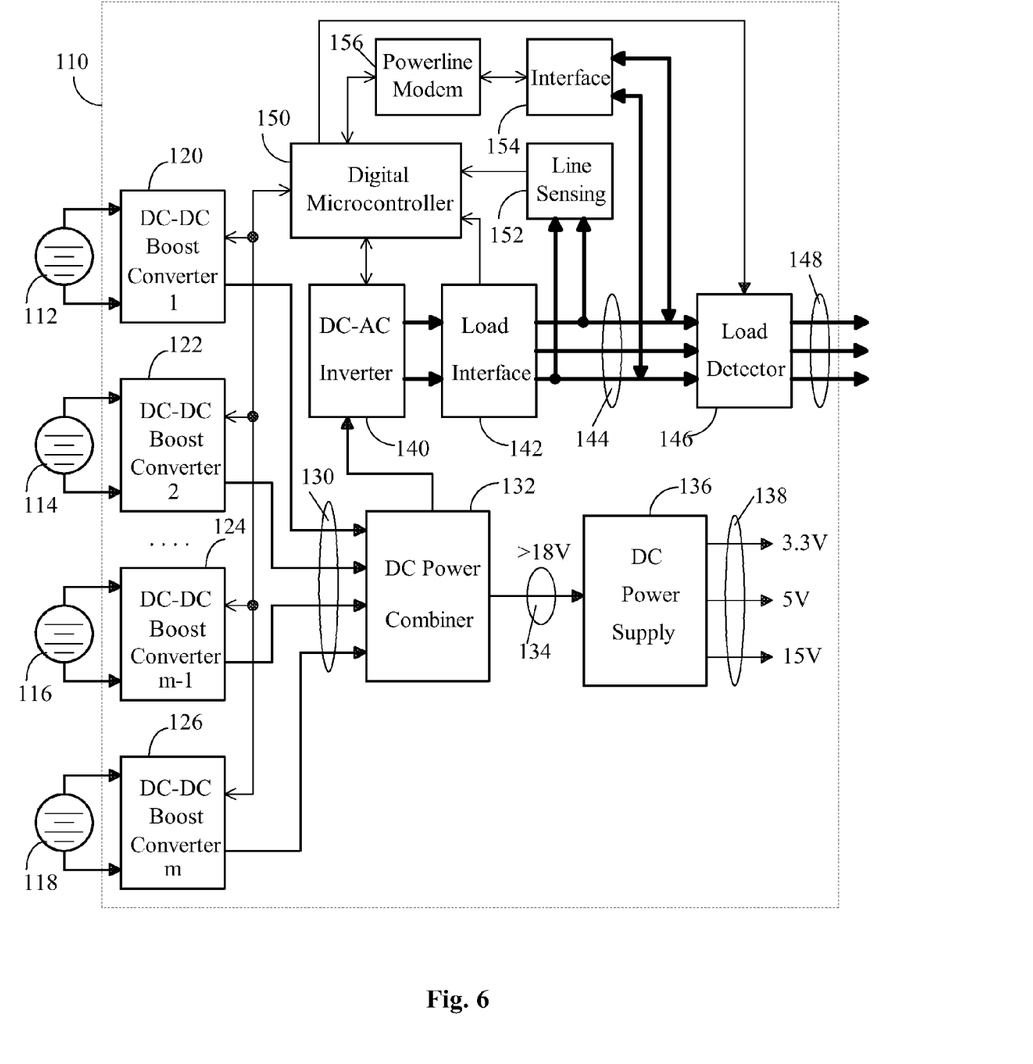
FIG. 6 is a block diagram illustrating an m-channel solar power off-grid Mini-Inverter that inverts the DC power from m solar panels to single-phase or three-phase AC power to power an AC load according to an embodiment of this invention.

FIG. 6 is a block diagram illustrating an m-channel off-grid solar power Mini-Inverter that inverts the DC power from m solar panels to single-phase or three-phase AC power to power an AC load according to an embodiment of this invention.

The m-channel off-grid Mini-Inverter 110 is connected to m solar panels 112, 114, 116, 118 as DC sources. The Mini-Inverter comprises m DC-DC boost converters 120, 122, 124, 126, a DC power combiner 132, a DC power supply 136, a DC-AC inverter 140, a load interface circuit 142, an internal AC powerline 144, a load detector 146, an external AC powerline 148 which connects to an AC load, a digital microcontroller 150, a line sensing circuit 152, an interface circuit for powerline communications 154, and a powerline communications Modem 156.

During normal operating conditions where there is sufficient sunlight, the power from solar panels 112, 114, 116, 118 is delivered to the corresponding DC-DC boost converters 120, 122, 124, 126, respectively. The DC power is then combined in the DC power combiner 132. The total combined DC power is inverted to AC power within a user specified voltage range such as 120 VAC+/−10% or 240 VAC+/−10% by the DC-AC inverter 140. The generated AC power is sent to the AC load through the load interface circuit 142, internal AC powerline 144, load detector 146, and external AC powerline 148. A line sensing circuit 152 connected to the AC powerline 144 is used to detect if there is AC power on the powerline prior to the startup of the off-grid Mini-Inverter. The line sensing circuit 152 is also used for monitoring the load on the AC powerline for over voltage, under voltage, over current, or under current conditions so that the total AC output voltage can be regulated to protect the Mini-Inverter and the AC load.

The load detector 146 is an electronic circuit that can detect the impedance of the connected AC load. If no AC power is detected on the powerline, the load detector 146 checks the impedance of the AC powerline to determine if the connected AC load is within certain specifications. The load detector in this embodiment can be designed using standard LRC meter impedance measurement circuits and mechanism such as those described in the book, "The measurement of Lumped Parameter Impedance: A Metrology Guide" published by University of Michigan Library in January 1974.

The m-channel off-grid solar power Mini-Inverter described in this embodiment can be designed as an AC Master off-grid Mini-Inverter or a regular off-grid Mini-Inverter as disclosed in the U.S. patent application No. 61/495,540. For a regular off-grid Mini-Inverter, the load detector 146 is replaced by a solid-state switch circuit 96 as described in FIG. 4.

A powerline communications Modem 156, which is isolated by an interface circuit 154, is used to establish a 2-way digital signal communication between the digital microcontroller 150 and the outside world through the AC powerline. The internal DC power supply 136 takes DC power from one of the solar panels through its corresponding DC converter and the DC combiner to supply DC power to the internal electronics.

If the Mini-Inverter 110 is an AC Master Off-Grid Mini-Inverter, the digital microcontroller performs the tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each DC source, (v) performing DC-AC inversion, (vi) monitoring AC current and voltage for generated power amount and status, (vii) performing powerline communications, (viii) checking the impedance of the AC powerline to determine if the connected AC load is within certain specifications, (ix) initially energizing the AC powerline that has no power running to it, (x) continually delivering AC power to the AC powerline to allow the other off-grid Mini-Inverters also connected on the same powerline to synchronize the AC power being produced, (xi) continually checking and determining whether the AC load is too large or too small for the power generation system to handle, and (xii) turning the power off and triggering an error signal if the load is too large or too small.

If the Mini-Inverter 110 is a regular off-grid Mini-Inverter, the digital microcontroller 150 is used to perform a number of tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each solar panel, (v) performing DC-AC inversion, AC power synchronization, and AC output current control, (vi) monitoring AC current and voltage for generated power amount and status, (vii) performing powerline communications, and (viii) performing logic controls such as AC powerline switching and isolation.

During normal operating conditions when there is sufficient sunlight, all m channels of the Mini-Inverter can run in the power generation mode and provide sufficient power to the AC load. During sunrise, sunset, clouding, or partial shading conditions, the Mini-Inverter can detect the low sunlight situation based on the DC input power. Then, it will go into the low power mode.

Figure 7:
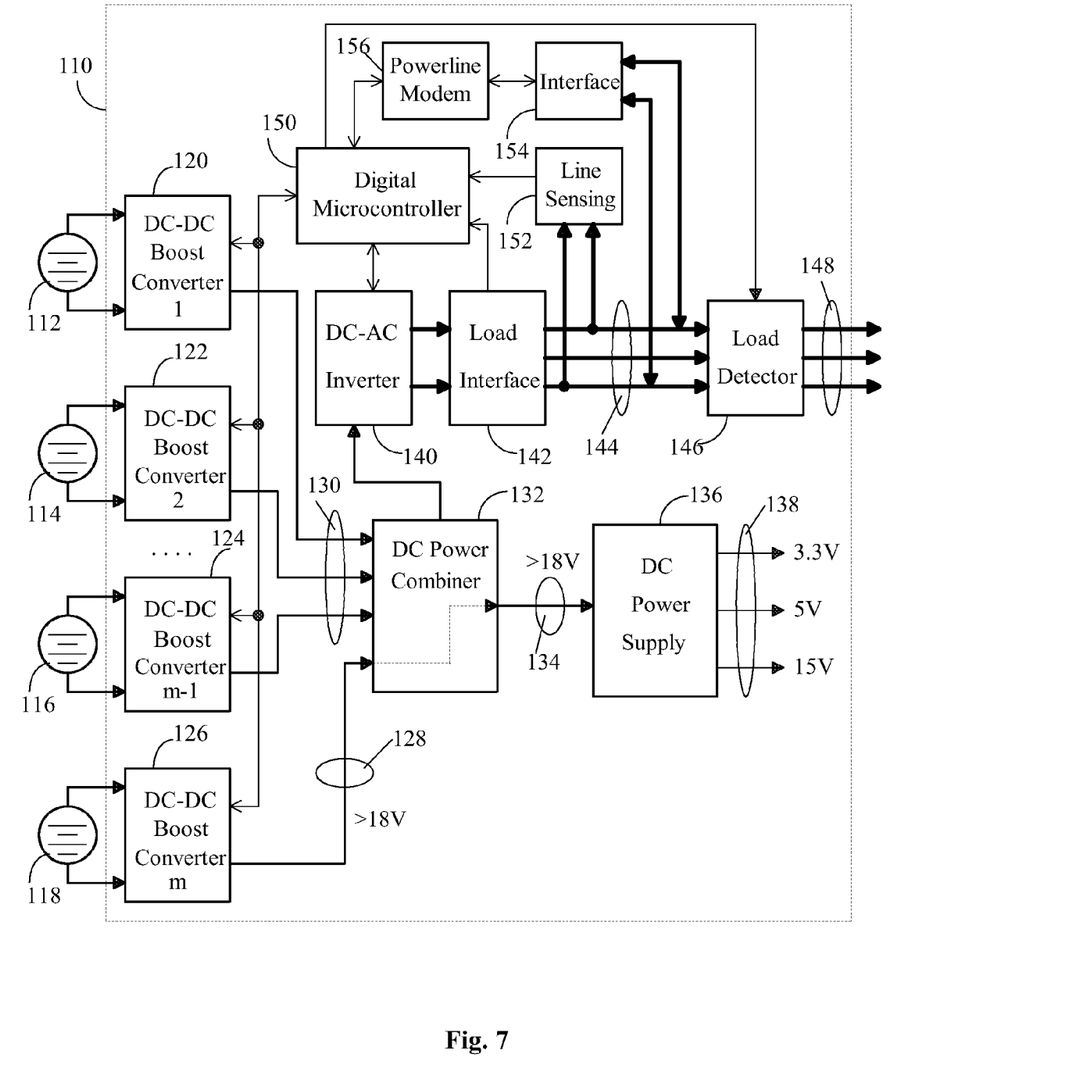
FIG. 7 is a block diagram illustrating the same m-channel solar power off-grid Mini-Inverter as in FIG. 6, working in the low power mode, where it can take power from one solar panel to supply DC power to its internal electronics and also invert the DC power from the remaining m−1 connected solar panels to single-phase or three-phase AC power to power an AC load according to an embodiment of this invention.

FIG. 7 is a block diagram illustrating the same m-channel off-grid solar power Mini-Inverter as in FIG. 6, working in the low power mode, where it can take power from one solar panel to supply DC power to its internal electronics and also invert the DC power from the remaining m−1 connected solar panels to single-phase or three-phase AC power to power an AC load according to an embodiment of this invention.

In the low power mode, the digital microcontroller 150 will select a channel such as channel m and control the corresponding DC-DC boost converter 126 so that it stops pulling power from its connected solar panel 118 for AC power generation. As illustrated in FIG. 7, the DC power from solar panel 118 can pass through the DC converter 126 and DC power combiner 132, and enter DC power supply 136. Since a typical 60-cell or 72-cell solar panel will have an open-circuit voltage of 30V to 45V, and since the DC power supply takes only a small amount of power to power the internal circuits, the DC power line 128 and 134 can easily maintain at a voltage that is higher than 18V.

For an off-grid solar power Mini-Inverter, AC power production is also dependent on the AC load. That means, if the produced AC power in the low power mode cannot meet the power requirements of the AC load, the off-grid solar power Mini-Inverter will stop producing power. On the other hand, if the produced AC power meets the AC load requirements, the off-grid Mini-Inverter can still supply power to the AC load even under low sunlight conditions. This feature can be useful for off-grid solar power applications where the AC loads are more flexible with required power such as lights.

Figure 8:
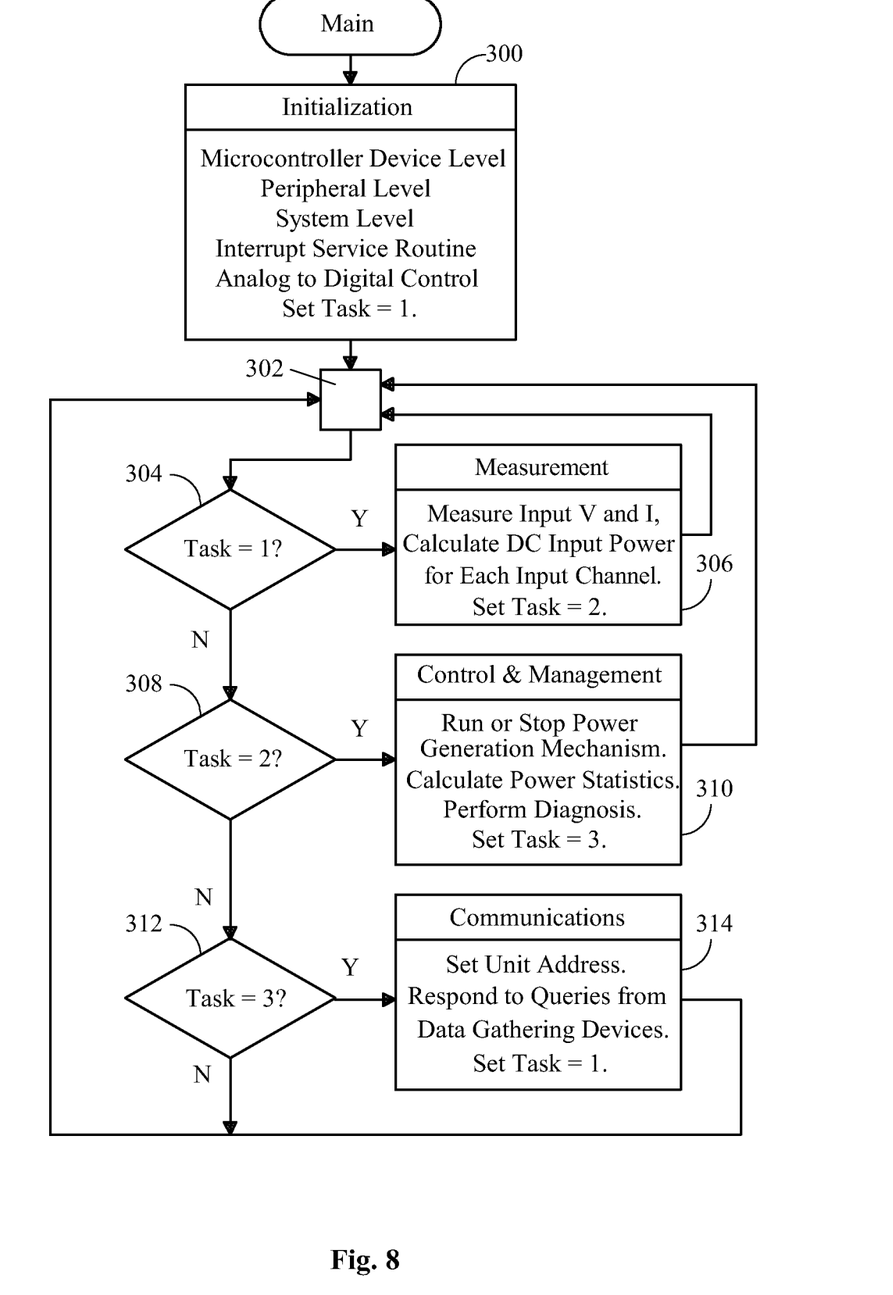
FIG. 8 is a flow chart describing the main software program running in the digital microcontroller of an m-channel solar power Mini-Inverter, which includes Measurement tasks, Control & Management tasks comprising a Power Generation Mechanism, and Communication tasks.

FIG. 8 is a flow chart describing the main software program running in the digital microcontroller of an m-channel solar power Mini-Inverter, which includes Measurement tasks, Control & Management tasks comprising a Power Generation Mechanism, and Communication tasks. At Block 300, initialization is taking place in the microcontroller device level, peripheral level, system level, and for the interrupt service routine and analog and digital control routines. More specifically, initialization will include but is not limited to setting up registers, I/Os, and timers and enabling interrupts for the interrupt service routine. At the end of initialization, the program sets Task=1.

In the main program, there are three major tasks. Task 1 is related to the DC power measurement of the Mini-Inverter. Task 2 is related to the control and management of the Mini-Inverter. Task 3 is related to the communications of the Mini-Inverter to the outside world through the powerline Modem. After initialization, the main program enters the main loop entry point 302 and then goes to Block 304.

At Block 304, the program checks to see if Task 1 is scheduled to run. If the answer is Yes, the program will execute the functions in Block 306 to (i) measure the input voltage and current for each input channel, and (ii) calculate the DC input power for each input channel After that, the program sets Task=2 and returns to Block 302, which is the entry of the main loop.

When the program continues, it will go through Block 304, and reach Block 308. At Block 308, the program checks to see if Task 2 is scheduled to run. If the answer is No, it will proceed to Block 312. If the answer is Yes, the program will (i) run or stop the power generation mechanism based on the conditions of the solar panels, the Mini-Inverter, the AC powerline, or AC load; (ii) calculate power statistics such as the amount of power generated during a certain period of time; and (iii) perform system diagnosis. After that, the program sets Task=3 and returns to Block 302, which is the entry of the main loop.

When the program continues, it will reach Block 312. At Block 312, the program checks to see if Task 3 is scheduled to run. If the answer is Yes, the program will execute the functions in Block 314 to (i) set the unit address for the Mini-Inverter, and (ii) respond to queries from data gathering or acquisition devices to report the power statistics. Then, it sets Task=1 and returns to Block 302. The main program runs continuously based on a preset loop rate to execute the scheduled tasks. At any time an interrupt is triggered, the digital microcontroller immediately processes the pending interrupt service routine.

The key components, functions, and steps in the interrupt service routine embedded in the digital microcontroller are described in the U.S. patent application Ser. No. 12/837,162.

Figure 9:
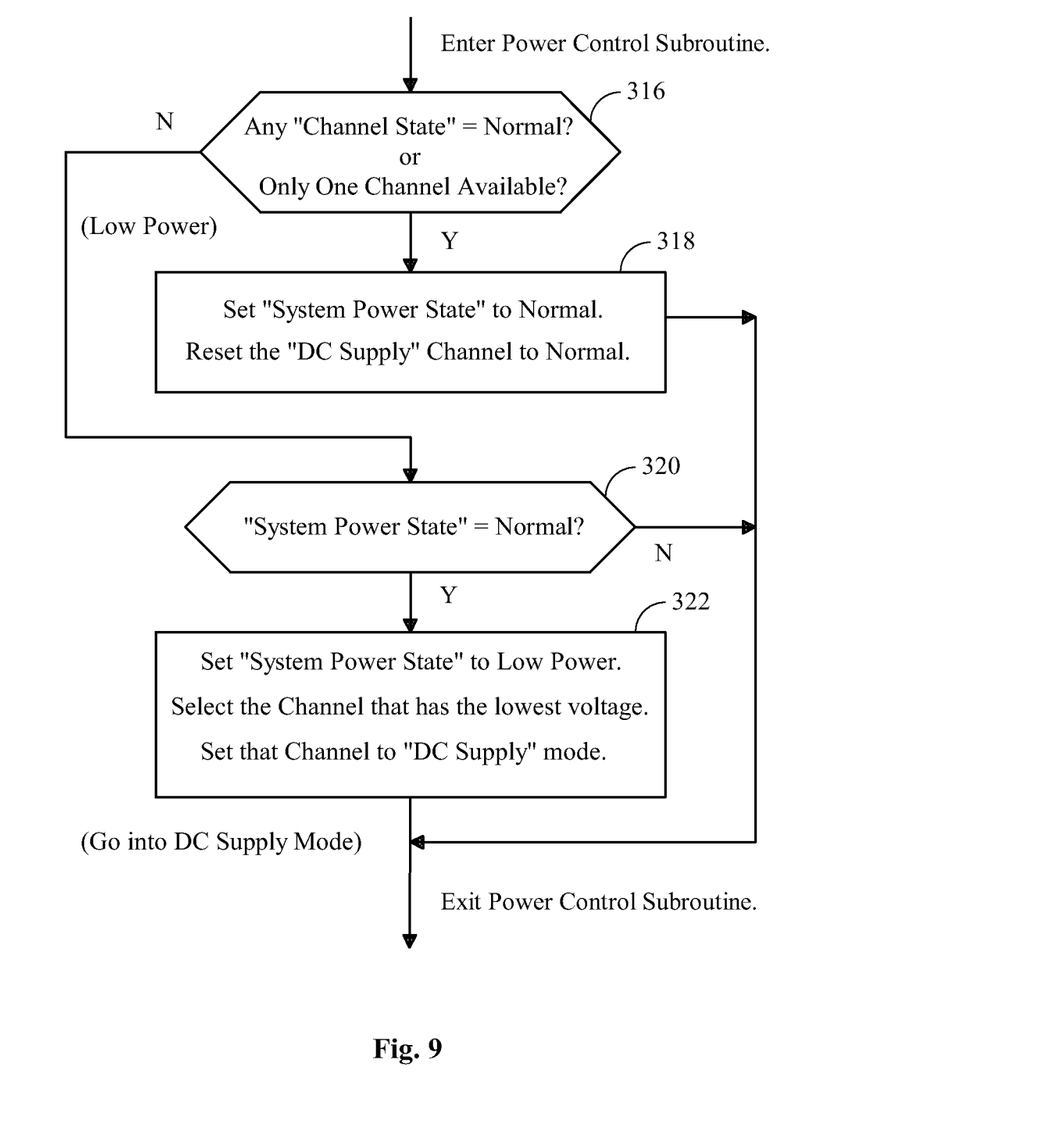
FIG. 9 is a flow chart describing the Power Control Subroutine, which is invoked by the Power Generation Mechanism of FIG. 8, running in the digital microcontroller of a solar power Mini-Inverter according to an embodiment of this invention.

FIG. 9 is a flow chart describing the Power Control Subroutine, which is invoked by the Power Generation Mechanism of FIG. 8, running in the digital microcontroller of a solar power Mini-Inverter according to an embodiment of this invention.

There are two internal variables in the Power Control Subroutine as listed in Table 1: (i) System Power State for the Mini-Inverter, and (ii) Channel State for each input channel

TABLE 1

| Variable Name | State 1 | State 2 |
|---|---|---|
| System Power State | Normal | Low Power |
| Channel State | Normal | DC Supply Mode |

The "System Power State" saves the status for the system power. If it is normal, all m channels generate AC power. If it is in the Low Power mode, the digital microcontroller will select a channel that has the lowest input voltage and control the corresponding DC-DC boost converter so that it stops pulling power from its connected solar panel for AC power generation. Then, the DC power from the connected solar panel of that channel will be the input power to the internal DC power supply. Channel State saves the status for each input channel of the m-channel solar power Mini-Inverter, which is either in "Normal" or in "DC Supply" mode. As the word suggests, the "DC Supply" mode indicates that the channel is not pulling power from its connected solar panel for AC power generation but supplies DC power to the internal DC power supply.

As shown in FIG. 9, at Block 316, the program checks to see if the "Channel State" of any of the m channels is normal or if only one channel is available. If the answer is Yes, it means that (i) there is sufficient irradiance in at least one of the channels so that it can provide DC power to the internal power supply while generating AC power; or (ii) the m-channel Mini-Inverter has only one channel available, then there is no need to use this channel just to supply DC power to the internal power supply. In this case, the program will execute the functions in Block 318 to (i) set "System Power State" to normal, and (ii) reset the "DC Supply" channel to normal. Then, the program exits the subroutine.

If the answer is No, it means the system has low power. At Block 320, the program checks if "System Power State" is normal. If it is No, it means the system is already running in the low power mode. Then the program exits the subroutine.

If the answer is Yes, the program will execute the functions in Block 322 to (i) set "System Power State" to Low Power, (ii) select the channel that has the lowest input voltage, and (iii) set that channel to "DC Supply" mode. Then, the program exits the subroutine. In the "DC Supply" mode, the selected channel supplies DC power to the internal DC power supply, and is not generating AC power.

To summarize, this patent disclosed a method and apparatus that allow us to harvest more sun power during sunrise, sunset, clouding, partial shading, and other low irradiance conditions. Sunlight is an invaluable source of energy. We sometimes take its existence for granted. By taking advantage of this natural resource and harvesting as much sun power as possible, the earth could be a better and cleaner place to live.

The invention claimed is:

1. A multiple channel DC-to-AC power inverter, comprising:
 a) at least two DC power input ports;
 b) one AC power output port arranged to supply AC power to an electric grid;

c) for each DC power input port, a DC-DC boost converter arranged to convert voltage produced by a solar panel to a higher DC voltage suitable for inversion;

d) a DC power combiner connected to said DC-DC boost converters for combining DC output from all DC-DC boost converters and allowing the DC-DC boost converters to connect in parallel so that all DC currents are added together;

e) a DC-AC inverter connected to said DC power combiner and arranged to invert DC power to AC power;

f) an internal AC powerline that allows the AC power to be sent to the grid through an external AC powerline;

g) a load interface circuit connected to said DC-AC inverter and to said internal AC powerline, said load interface circuit being arranged to filter high-frequency components out of the said DC-AC inverter's AC output;

h) a digital microcontroller connected to said DC-DC boost converters, DC-AC inverter, and load interface circuit, said digital microcontroller arranged to perform one or more of measuring input voltage and current, calculating DC input power for each channel, monitoring DC voltage, controlling the DC-DC boost converters, performing maximum power point tracking (MPPT) for each solar panel, performing DC-AC inversion, AC power synchronization, and AC output current control, monitoring AC current and voltage for generated power amount and status, performing powerline communications, performing logic controls such as AC powerline switching and isolation, and running the multiple channel DC-to-AC power inverter in normal or low power mode based on calculated DC input power;

i) a powerline modem connected to the digital microcontroller and the internal AC powerline through an interface circuitry for transmitting and receiving performance data between the digital microcontroller and the electric grid;

j) a line sensing circuit connected to the internal AC powerline and the digital microcontroller for detecting phase and zero-crossing point of incoming AC power from the electric grid;

k) a solid state switch connected to said internal AC powerline and external AC powerline, and arranged to disconnect said internal AC powerline from the electric grid during non-generation time; and l) a DC power supply connected to the DC power combiner, arranged to supply DC power to electronic circuits of the multiple channel DC-to-AC power inverter, and configured with one input channel and its connected solar panel dedicated to supply DC power to the DC power supply when the digital microcontroller detects that calculated input power is below a pre-determined value.

2. The multiple channel DC-to-AC power inverter of claim 1, in which output of said multiple channel DC-to AC power inverter is single-phase AC or three-phase AC.

3. The multiple channel DC-to-AC power inverter of claim 1, in which said digital microcontroller includes Model-Free Adaptive (MFA) controllers which control the DC-DC boost converter, and MFA optimizers which provide maximum power point tracking (MPPT) to allow the power inverter to achieve optimal power production.

4. The multiple channel DC-to-AC power inverter of claim 1, in which the said digital microcontroller is programmed with a main program to iteratively:

a) measure input voltage and current, and calculate DC input power for each input channel;

b) run or stop the DC-AC inverter's power generation mechanism based on solar panel DC input power and conditions of the multiple channel DC-to-AC power inverter and AC powerline;

c) calculate DC-AC inverter power statistics such as amount of power generated during a predetermined period of time;

d) perform diagnostics for DC-AC inverter status and operation;

e) set a unit address for the multiple channel DC-to-AC power inverter;

f) perform powerline communications; and g) respond to queries from data gathering or acquisition devices to report power statistics.

5. The multiple channel DC-to-AC power inverter of claim 1, in which said digital microcontroller is further programmed with a power control subroutine to iteratively:

a) check if a "Channel State" of all input channels is normal or if only one channel is available;

b) if a) is positive, set "System Power State" to normal, reset a "DC Supply" channel to normal, and exit;

c) if a) is negative, check if "System Power State" is normal;

d) if c) is positive, set "System Power State" to Low Power, select the channel that has the lowest input voltage, set that channel to "DC Supply" mode, and exit; and e) if c) is negative, exit.

6. A multiple channel off-grid AC Master DC-to-AC power inverter, comprising:

a) at least two DC power input ports;

b) one AC power output port arranged to supply AC power to an AC load;

c) for each DC power input port, a DC-DC boost converter arranged to convert voltage produced by a solar panel to a higher DC voltage suitable for inversion;

d) a DC power combiner connected to said DC-DC boost converters for combining DC output from all DC-DC boost converters and allowing the DC-DC boost converters to connect in parallel so that all DC currents are added together;

e) a DC-AC inverter connected to said DC power combiner and arranged to invert DC power to AC power;

f) an internal AC powerline that allows the AC power to be sent to the AC load through an external AC powerline;

g) a load interface circuit connected to said DC-AC inverter and to said internal AC powerline, said load interface circuit being arranged to filter high-frequency components out of the DC-AC inverter's AC output;

h) a load detector connected to said internal AC powerline and external AC powerline, and arranged to detect impedance of the connected AC load;

i) a digital microcontroller connected to said DC-DC boost converter, DC-AC inverter, load interface circuit, and load detector, said digital microcontroller arranged to perform one or more of monitoring DC voltage and calculating DC input power for each channel, controlling the DC-DC boost converter, performing maximum power point tracking (MPPT), performing DC-AC inversion, monitoring AC current and voltage for generated power amount and status, performing powerline communications, checking impedance of the AC load to determine if it is within predetermined specifications, initially energizing the internal and external AC powerline, continually delivering AC power to the internal and external AC powerline to allow the other power inverters also connected on the same external powerline to synchronize the AC power being produced, continually checking and determining whether the AC load is too large or too small for the power generation system to handle, turning power off and triggering an error signal if the load is too large or too small, and running the multiple channel off-grid AC Master DC-to-AC power inverter in normal or low power mode based on calculated DC input power;

j) a powerline modem connected to said digital microcontroller and said internal AC powerline through an interface circuitry arranged to establish a 2-way digital signal communication between the digital microcontroller and the outside world through the external AC powerline;

k) a line sensing circuit connected to said internal AC powerline and said digital microcontroller, and arranged to detect if there is AC power on the internal AC powerline prior to the startup of the DC-AC inverter, and to monitor the internal AC powerline for over voltage, under voltage, over current, or under current conditions; and l) a DC power supply connected to the DC power combiner, arranged to supply DC power to electronic circuits of the multiple channel off-grid AC Master DC-to-AC power inverter, and configured with one input channel and its connected solar panel dedicated to supply DC power to the DC power supply when the digital microcontroller detects that the calculated input power is below a pre-determined value.

7. The multiple channel off-grid AC Master DC-to-AC power DC-AC inverter of claim 6, in which output of said inverter is single-phase AC or three-phase AC.

8. The multiple channel off-grid AC Master DC-to-AC power inverter of claim 6, in which said digital microcontroller includes Model-Free Adaptive (MFA) controllers which control the DC-DC boost converter, and MFA optimizers which provide maximum power point tracking (MPPT) to allow the power inverter to achieve optimal power production.

9. A multiple channel regular off-grid DC-to-AC power inverter, comprising:

a) at least two DC power input ports;

b) one AC power output port arranged to supply AC power to an AC load;

c) for each DC power input port, a DC-DC boost converter arranged to convert voltage produced by a DC power source to a higher DC voltage suitable for inversion;

d) a DC power combiner connected to said DC-DC boost converters for combining DC output from all DC-DC boost converters and allowing the said DC-DC boost converters to connect in parallel so that all DC currents are added together;

e) a DC-AC inverter connected to said DC power combiner and arranged to invert DC power to AC power;

f) an internal AC powerline that allows the AC power to be sent to the AC load through an external AC powerline;

g) a load interface circuit connected to said DC-AC inverter and to said internal AC powerline, said load interface circuit being arranged to filter high-frequency components out of the said DC-AC inverter's AC output;

h) a digital microcontroller connected to said DC-DC boost converters, DC-AC inverter, load interface circuit, line sensing circuit, and load detector, said digital microcontroller arranged to perform one or more of measuring input voltage and current, calculating DC input power for each channel, monitoring DC voltage, controlling the DC-DC boost converters, performing maximum power point tracking (MPPT) for each solar panel, performing DC-AC inversion, AC power synchronization, and AC output current control, monitoring AC current and voltage for generated power amount and status, performing powerline communications, performing logic controls such as AC powerline switching and isolation, and running the multiple channel regular off-grid DC-to-AC power inverter in normal or low power mode based on calculated DC input power;

i) a powerline modem connected to said digital microcontroller and said internal AC powerline through an interface circuitry arranged to establish a 2-way digital signal communication between the digital microcontroller and the outside world through the external AC powerline;

j) a line sensing circuit connected to said internal AC powerline and said digital microcontroller for detecting a phase and zero-crossing point of incoming AC power from the external AC powerline;

k) a solid state switch connected to said internal AC powerline and external AC powerline, and arranged to disconnect said internal AC powerline from the external AC powerline during non-generation time; and l) a DC power supply connected to the DC power combiner, arranged to supply DC power to electronic circuits of the multiple channel regular off-grid DC-to-AC power inverter, and configured with one input channel and its connected solar panel dedicated to supply DC power to the DC power supply when the digital microcontroller detects that the calculated input power is below a pre-determined value.

10. A method of providing DC power to a DC power supply to power internal electronic circuits for an m-channel solar power inverter, comprising:

a) entering and exiting a normal power mode or a low power mode based on measured input DC power;

b) in the low power mode, selecting one solar panel based on a pre-determined condition, stopping pulling power from the selected solar panel for AC power generation, and feeding the DC power from the solar panel to the DC power supply; and c) in the normal power mode, pulling power from all available solar panels for AC power generation and supplying DC power to the DC power supply.

11. The method of claim 10, in which output of the said m-channel solar power inverter is single-phase AC or three-phase AC.

12. The method of claim 10, in which the said m-channel solar power inverter sends AC power to an electrical grid or provides AC power to an AC load.

13. The method of claim 10, in which the said m-channel solar power inverter comprises:

a) at least two DC power input ports;

b) one AC power output port arranged to supply AC power to an electric grid;

c) for each DC power input port, a DC-DC boost converter arranged to convert voltage produced by a solar panel to a higher DC voltage suitable for inversion;

d) a DC power combiner connected to said DC-DC boost converters for combining DC output from all DC-DC boost converters and allowing the said DC-DC boost converters to connect in parallel so that all DC currents are added together;

e) a DC-AC inverter connected to said DC power combiner and arranged to invert DC power to AC power;

f) an internal AC powerline that allows the AC power to be sent to the grid through an external AC powerline;

g) a load interface circuit connected to said DC-AC inverter and to said internal AC powerline, said load interface circuit being arranged to filter high-frequency components out of the said DC-AC inverter's AC output;
h) a digital microcontroller connected to said DC-DC boost converters, DC-AC inverter, and load interface circuit, said digital microcontroller arranged to monitor DC voltage and calculate DC input power for each channel, control the DC-DC boost converters, perform maximum power point tracking (MPPT) for each solar panel, perform DC-AC inversion, AC power synchronization, and AC output current control, monitor AC current and voltage for generated power amount and status, perform powerline communications, perform logic controls such as AC powerline switching and isolation, and run the m-channel solar power inverter in normal or low power mode based on calculated DC input power;
i) a powerline modem connected to the digital microcontroller and the internal AC powerline through an interface circuitry for transmitting and receiving performance data between the digital microcontroller and the electric grid;
j) a line sensing circuit connected to the internal AC powerline and the digital microcontroller for detecting phase and zero-crossing point of incoming AC power from the electric grid;
k) a solid state switch connected to said internal AC powerline and external AC powerline, and arranged to disconnect said internal AC powerline from the electric grid during non-generation time, and
l) a DC power supply connected to the DC power combiner, arranged to supply DC power to electronic circuits of the m-channel solar power inverter, and configured with one input channel and its connected solar panel dedicated to supply DC power to the DC power supply when the digital microcontroller detects that calculated input power is below a pre-determined value.

14. An m-channel solar power inverter, comprising:
a) at least two DC input channels, each of which comprises a DC-DC boost converter, measurement circuits, supporting circuits, and cables and connectors to connect to a solar panel;
b) an AC power output port arranged to supply AC power to an electric grid;
c) a DC power combiner connected to said DC-DC boost converters for combining DC output from all DC-DC boost converters;
d) a digital microcontroller connected to said DC-DC boost converters, arranged to measure input voltage and current to calculate DC input power for each channel, and constructed to run the power inverter in normal or low power mode based on calculated DC input power;
e) a DC power supply connected to all input channels through the DC power combiner, arranged to supply DC power to electronic circuits of the power inverter, and configured to take DC power from a dedicated input channel and its connected solar panel when the digital microcontroller detects that calculated input power is below a pre-determined value.

15. The m-channel solar power inverter of claim 14, in which output of the said m-channel solar power inverter is single-phase AC or three-phase AC.

16. The m-channel solar power inverter of claim 14, in which the said m-channel solar power inverter sends AC power to an electrical grid or provides AC power to an AC load.

* * * * *